Nov. 3, 1925.
J. ROGLER
LOCK NUT
Filed Feb. 27, 1923
1,560,324
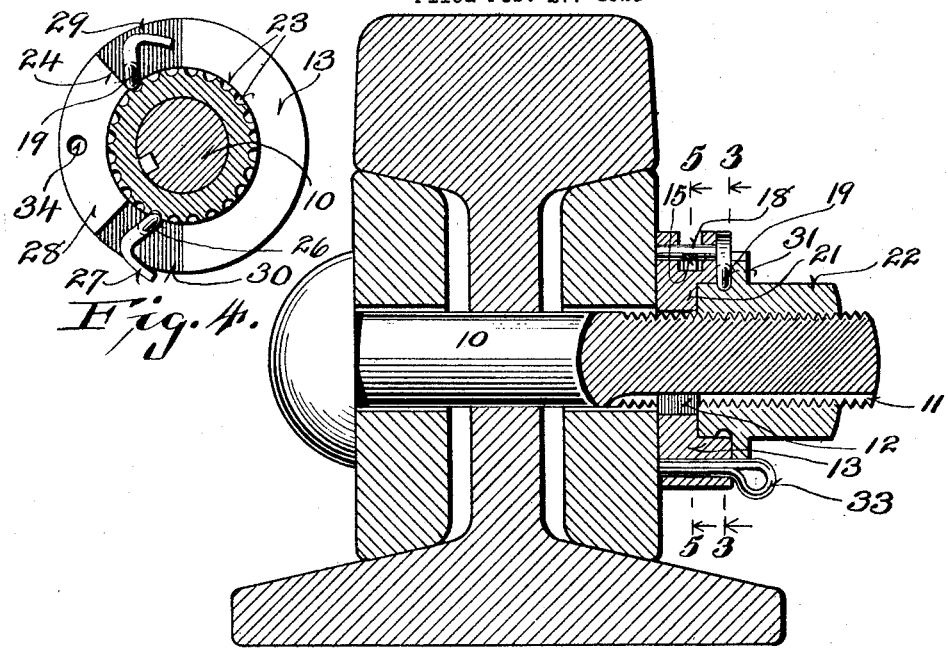
Fig. 4.
Fig. 1.
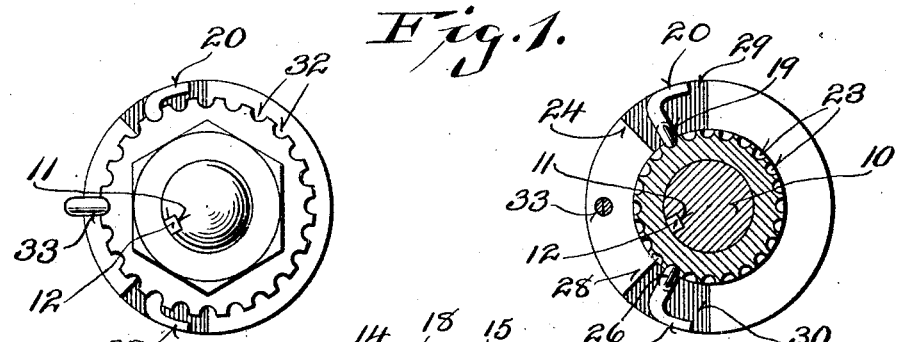
Fig. 2.
Fig. 3.
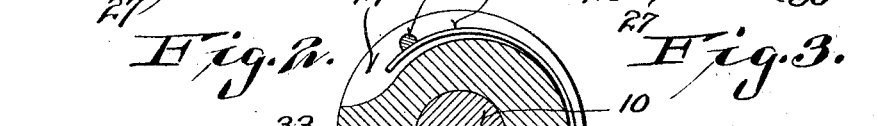
Fig. 5.
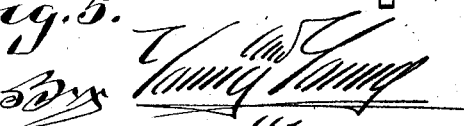
Fig. 6.
Inventor
John Rogler Patented Nov. 3, 1925.

1,560,324

UNITED STATES PATENT OFFICE.

JOHN ROGLER, OF JEFFERSON, WISCONSIN.

LOCK NUT.

Application filed February 27, 1923. Serial No. 621,563.

*To all whom it may concern:*

Be it known that I, JOHN ROGLER, a citizen of the United States, and resident of Jefferson, in the county of Jefferson and State of Wisconsin, have invented certain new and useful Improvements in Lock Nuts; and I do hereby declare that the following is a full, clear, and exact description thereof.

In the invention a nut is provided, retained securely with a lock, the nut having an endless series of notches therein adapted to receive the ends of a pair of spring urged detents. It is tightened by rotation on a bolt and urges the lock against the object through which the bolt is directed. One of the detents when engaged in a notch opposes tightening movement of the nut; it therefore is swung to inoperative position when the nut is given a right hand turn. The other detent prevents reverse rotation of the nut. The former detent is moved into engagement with a notch after the unit is tightened into place.

A primary object of the invention is the ease of operation of the device, the mere rotation of the nut operating to clamp it properly in position. There is no resistance to the clamping movement of the nut except that which is ordinarily encountered.

An object of the invention is the reliability of the device, which is retained in locking relationship despite vibration and shock. There is no tendency of the bolt to release. The action of the detents is positive and strong and there is no danger of wear of parts in suchwise as to release the detents. The lock is provided with a key, preventing it from rotating with respect to the bolt with which it contacts, so that all parts are maintained permanently in rigid locking relationship. The nut is locked against movement in any direction. Shock and vibration cannot release the detents.

Figure 1 is a longitudinal sectional view through the lock nut, showing it applied to a rail joint.

Figure 2 is an end view of the lock nut in position on a bolt.

Figures 3 and 4 are sections on the line 3—3 of Figure 1, showing detents in different positions.

Figure 5 is a section on the line 5—5 of Figure 1.

Figure 6 is a detail of a spring, showing its manner of securement.

Bolt 10 is provided with a longitudinal groove 11, extending throughout the length of the threaded portion and receiving a key 12 carried by lock 13. The outer cylindrical face of the lock is cut away to provide a recess 14 for a spring 15 and a recess 16 for a spring 17. Each of the springs is tapered towards its free end and its wider end is received in a pair of slots, as shown in Figure 6. To position a spring it is merely necessary to move it longitudinally, bringing the widened portion into the slots. A spindle 18, is journaled to rotate in the lock and extends across the width of recess 14. The spindle is cylindrical throughout, excepting for a flattened face disposed in the recess, adapted to contact with spring 15 and operate, by reason of the tension of the spring, to maintain a detent 19, which is rigid with the spindle inwardly disposed in a radial direction. Integral with detent 19 is an arm 20, which may be moved outwardly manually to alter the position of the detent. The lock is provided with a small bore 21, conforming to the surface of the bolt, and a large bore in which the end of nut 22 is fitted. The nut is provided with a series of notches 23, each adapted to receive detent 19. It is apparent that the detent 19 will permit a right hand turn of the nut, as there is nothing operative immediately to prevent the anti-clockwise movement of the detent, viewing it as shown in Figure 3.

The reverse rotation of the nut is prevented, however, by the detent, which is brought in contact with a shoulder 24. When the nut is given a right hand turn, the detent moves slightly, being displaced from a notch, and then returns to its radial position under the actuation of spring 15, which tends to restore the spindle to such a position that the flat face thereof is in contact with the spring.

In recess 16 a second spindle 25 is provided, having a detent 26 thereon and an arm 27, the arm being disposed oppositely to arm 20. The springs 17 and 15 cooperate with the spindle 25 and with the spindle 18, as shown in Figure 2. When the nut is being tightened into position, key 12 slides longitudinally in slot 11 and arm 27 is moved outwardly manually or by suitable tool. On sufficient outward movement of arm 27, spring 17 contacts only with a cylindrical surface of the spindle, and it is inoperative to restore the detent to dogging position.

After the nut 22 is moved to final position, detent 26 is moved by means of arm 27 into engagement with a notch 23. The detents are then as shown in Figure 3. The nut 22 is then effectively locked in place and cannot be rotated in either direction. It is impossible, therefore, for the nut to be released by shock or vibration. To release the nut a right hand movement thereof is necessary, in order that detent 19 may be disengaged. Shock and vibration could not effectuate this rotation of the nut. Right hand rotation of the nut causes detent 26 to contact with shoulder 28 on the lock; thus dentent 26 locks the nut against further movement in this direction.

Detents 19 and 26 lie in recesses 29 and 30 in the outer face of the lock. A flange 31 on nut 22 fits against this face and overlies the detents preventing accidental displacement thereof. The edge of the flange is provided with a series of indentations 32, adapted to receive a pin 33 which may be inserted into a hole 34 in the lock, and which affords an additional safety lock.

Instead of key 12, the lock may be provided with teeth adapted to bite into penetrable surfaces.

The invention is not limited to the details of construction described, but a substantial range of equivalence is contemplated within the scope of the appended claim.

I claim:

The combination of a bolt having a longitudinal groove extending throughout the length of its threaded portion, a lock fitting about said bolt, a key carried by said lock slidable in said groove, a nut having a series of notches in its outer face, a detent engageable in said notches, means cooperating with said detent to permit a right hand turn of said nut and preventing a reverse turn thereof, a second detent engageable in said notches, means cooperating with said second detent to permit a left hand turn of said nut and prevent a right hand turn of said nut, an arm on said first detent manually operable to move said detent to inoperative position, an arm on said second detent manually operable to move said detent to inoperative position, said lock having a peripheral groove provided with upper and lower under cut portions and a pair of tapered springs having their enlarged ends fitted within said grooves and having their smaller ends operatively engaging said detents and urging said detents towards locking position.

In testimony that I claim the foregoing I have hereunto set my hand at Jefferson, in the county of Jefferson, and State of Wisconsin.

JOHN ROGLER.